United States Patent
Khachane et al.

(10) Patent No.: US 11,401,039 B2
(45) Date of Patent: Aug. 2, 2022

(54) ANGULAR ARMREST ADJUSTMENT ASSEMBLY

(71) Applicant: B/E Aerospace, Inc., Winston Salem, NC (US)

(72) Inventors: Yashashree Umakant Khachane, Bangalore (IN); Pradeep Acharya, Bangalore (IN)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 17/134,326

(22) Filed: Dec. 26, 2020

(65) Prior Publication Data

US 2021/0300568 A1 Sep. 30, 2021

(30) Foreign Application Priority Data

Mar. 25, 2020 (IN) .............................. 202041013000

(51) Int. Cl.
*B64D 11/06* (2006.01)
*A47C 7/54* (2006.01)

(52) U.S. Cl.
CPC .......... *B64D 11/0644* (2014.12); *A47C 7/541* (2018.08); *A47C 7/543* (2013.01)

(58) Field of Classification Search
CPC ............ A47C 7/54; A47C 7/543; B60N 2/767
See application file for complete search history.

(56) References Cited

U.S. PATENT DOCUMENTS

| 5,597,209 | A | * | 1/1997 | Bart | ....................... | B60N 2/767 |
| | | | | | | 297/411.38 |
| 6,752,462 | B1 | | 6/2004 | Kain et al. | | |
| 8,480,177 | B2 | | 7/2013 | Kobayashi et al. | | |
| 10,457,177 | B2 | | 10/2019 | Nuss et al. | | |
| 2012/0133189 | A1 | | 5/2012 | Kobayashi et al. | | |
| 2021/0372493 | A1 | * | 12/2021 | Taniguchi | ............. | B60N 2/767 |

FOREIGN PATENT DOCUMENTS

| CN | 102805502 | | 12/2012 | | |
| EP | 1477358 | | 11/2004 | | |
| EP | 1 627 769 | A2 * | 2/2006 | ............. | B60N 2/767 |
| JP | 2010125219 | | 6/2010 | | |

OTHER PUBLICATIONS

European Patent Office; European Search Report dated Aug. 26, 2021 in Application No. 21164579.1.

* cited by examiner

*Primary Examiner* — Sarah B McPartlin
(74) *Attorney, Agent, or Firm* — Snell & Wilmer L.L.P.

(57) ABSTRACT

An armrest may comprise a first casing and a second casing coupled to the first casing. An angular armrest adjustment assembly may be located between the first casing and the second casing. The angular armrest adjustment assembly may comprise a hub coupled the first casing, a lever ring configured to engage a splined surface of the hub, and a biasing member configured to bias the second casing away from the lever ring.

12 Claims, 5 Drawing Sheets

ANGULAR ARMREST ADJUSTMENT ASSEMBLY

CROSS-REFERENCE TO RELATED APPLICATIONS

This application claims priority to, and the benefit of, India Patent Application No. 202041013000, filed Mar. 25, 2020, 2020 and titled "ANGULAR ARMREST ADJUSTMENT ASSEMBLY," which is incorporated by reference herein in its entirety for all purposes.

FIELD

The present disclosure relates to seats, and, more specifically, to an aircraft seat having an angular armrest adjustment assembly.

BACKGROUND

Aircraft seats may include adjustable armrests. The angle of the armrests may be adjusted for increased passenger comfort. Current adjustable armrests may include a knob and rod assembly, wherein the rotational motion of the knob is converted to linear motion of the rod. The linear motion of the rod may generate a force configured to rotate the armrest about a shaft. The knob and rod assembly tends to be difficult to assemble and tends to be associated with an increased weight and number of parts.

SUMMARY

An angular armrest adjustment assembly is disclosed herein. In accordance with various embodiments, the angular armrest adjustment assembly may comprise a lever ring, a hub, and a biasing member. The lever ring may include an inner circumferential surface defining a plurality of radially inward teeth. The hub may be configured to receive a portion of the lever ring. The hub may comprise an inner splined surface configured to engage an interference point formed by the portion of the lever rings. The biasing member may be configured to apply a force to the lever ring.

In various embodiments, a spring support may be coupled to the lever ring. In various embodiments, the biasing member may comprise a coil spring located around the spring support.

In various embodiments, a first shaft clip may be located between the hub and the lever ring, a second shaft clip may be located adjacent to an axial surface of the lever ring. The lever ring may be located axially between the first shaft clip and the second shaft clip. In various embodiments, a washer may be located around the spring support. The biasing member may be located between the washer and the axial surface of the lever ring.

In various embodiments, the lever ring may include a hook extending radially outward from the lever ring.

An armrest is also disclosed herein. In accordance with various embodiments, the armrest may comprise a first casing, a second casing coupled to the first casing, and an angular armrest adjustment assembly located between the first casing and the second casing. The angular armrest adjustment assembly may comprise a hub coupled the first casing, a lever ring configured to engage a splined surface of the hub, and a biasing member configured to bias the second casing away from the lever ring.

In various embodiments, the biasing member may be located between an internal surface of the second casing and an axial surface of the lever ring. In various embodiments, a spring support may be coupled to the lever ring. An end of the spring support may be located in a channel formed in the internal surface of the second casing.

In various embodiments, a shaft may be located through the first casing and the second casing. An outer circumferential surface of the shaft may define a plurality of first teeth. The plurality of first teeth may be intermeshed with a plurality of second teeth defined by an inner circumferential surface of the lever ring.

In various embodiments, the angular armrest adjustment assembly may further comprise a first shaft clip located in a first groove defined the shaft, and a second shaft clip located in a second groove defined by the shaft. The lever ring may be located axially between the first shaft clip and the second shaft clip.

In various embodiments, a portion of the lever ring may include a plurality of interference points configured to engage the splined surface of the hub. In various embodiments, a distance between the internal surface of the second casing and the axial surface of the lever ring may be greater than a length of engagement between the splined surface of the hub and the lever ring. In various embodiments, axial translation of the second casing toward the axial surface of the lever ring may be configured to disengage the hub from the lever ring.

A seat is also disclosed herein. In accordance with various embodiments, the seat may comprise a frame, a seatback and a seat pan coupled to the frame, and an armrest coupled to the frame. The armrest may include a first casing and a second casing coupled to the first casing the armrest. The seat may further comprise an angular armrest adjustment assembly located within an internal volume of the armrest and configured to rotate the armrest relative to the frame. The angular armrest adjustment assembly may comprise a hub coupled the first casing of the armrest, a lever ring configured to engage a splined surface of the hub, and a biasing member configured to bias the second casing of the armrest away from the lever ring.

In various embodiments, axial translation of the second casing toward an axial surface of the lever ring may be configured to disengage the hub from the lever ring. A distance between an internal surface of the second casing and the axial surface of the lever ring may be greater than a length of engagement between the splined surface of the hub and the lever ring.

In various embodiments, the biasing member may be located between the internal surface of the second casing and the axial surface of the lever ring. In various embodiments, a spring support may be coupled to the lever ring. An end of the spring support may be located in a channel formed in the internal surface of the second casing.

In various embodiments, a shaft may be coupled to the frame. The shaft may be located through the first casing and the second casing. An outer circumferential surface of the shaft may define a plurality of first teeth. The plurality of first teeth may be intermeshed with a plurality of second teeth defined by an inner circumferential surface of the lever ring.

In various embodiments, the angular armrest adjustment assembly may further comprise a first shaft clip located in a first groove defined the shaft, and a second shaft clip located in a second groove defined by the shaft. The lever ring may be located axially between the first shaft clip and the second shaft clip.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily repeated herein for the sake of clarity.

Figure 1:
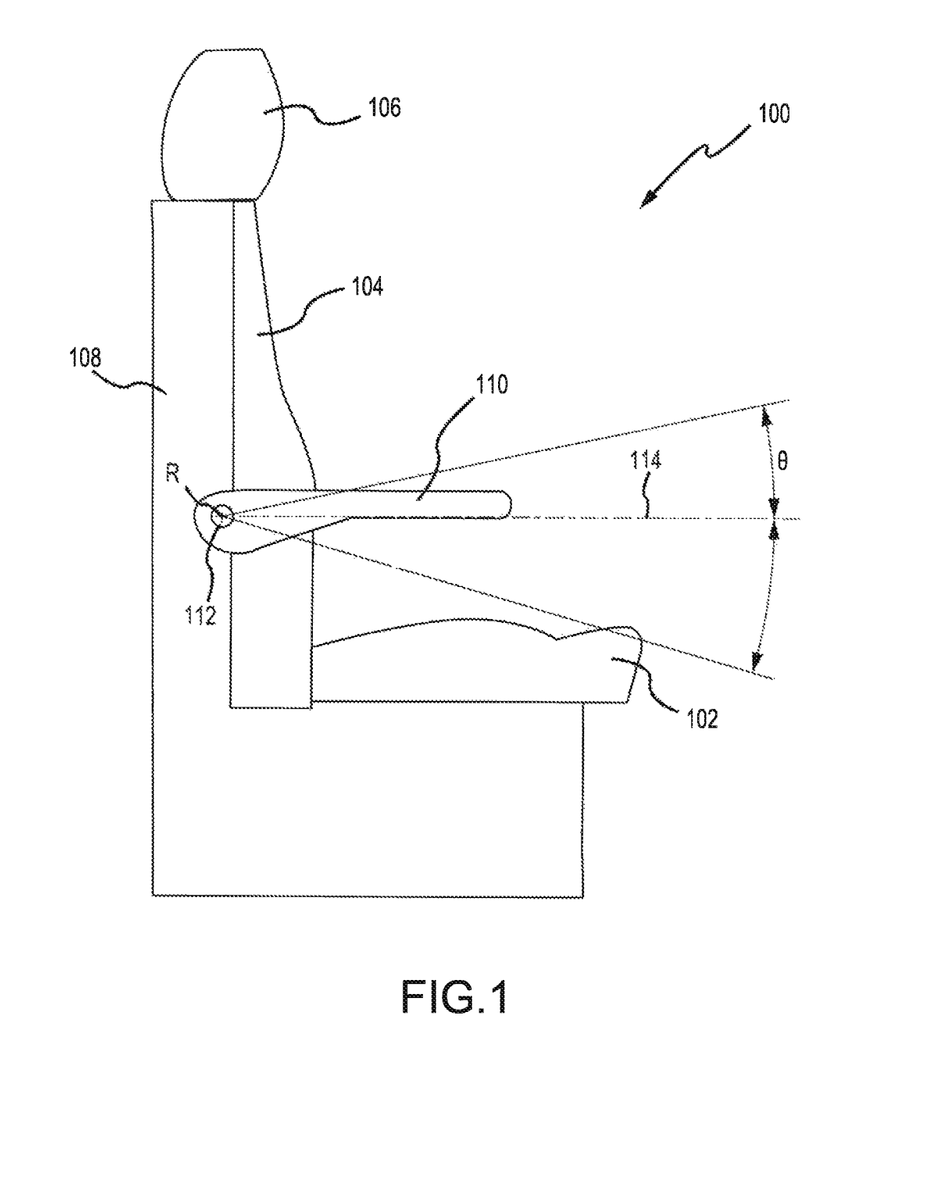
FIG. 1 illustrates a side view of an aircraft seat having an adjustable armrest, in accordance with various embodiments.

With reference to FIG. 1, a seat 100 is shown. In various embodiments, seat 100 may be an aircraft seat. Seat 100 includes a seat pan 102, a backrest 104, and a headrest 106. Seat pan 102, backrest 104, and headrest 106 may be supported by a frame 108 of seat 100. Frame 108 may provide structural support for seat pan 102, backrest 104, and headrest 106.

In accordance with various embodiments, seat 100 may include a pair of adjustable armrests 110 located at opposing sides of backrest 104. As described in further detail below, armrests 110 may each include an angular armrest adjustment assembly configured to allow the armrest 110 to pivot relative to frame 108. In various embodiments, armrest 110 may pivot about a shaft 112 mounted to frame 108. The angular armrest adjustment assembly may allow an angle theta ($\theta$) of the armrest 110 to be adjusted. Angle theta ($\theta$) may be the angle of the armrest 110 relative to a horizontal plane 114. Horizontal plane 114 is generally normal to backrest 104. As used in the previous context only, "generally normal" means±5° from normal.

Figure 2:
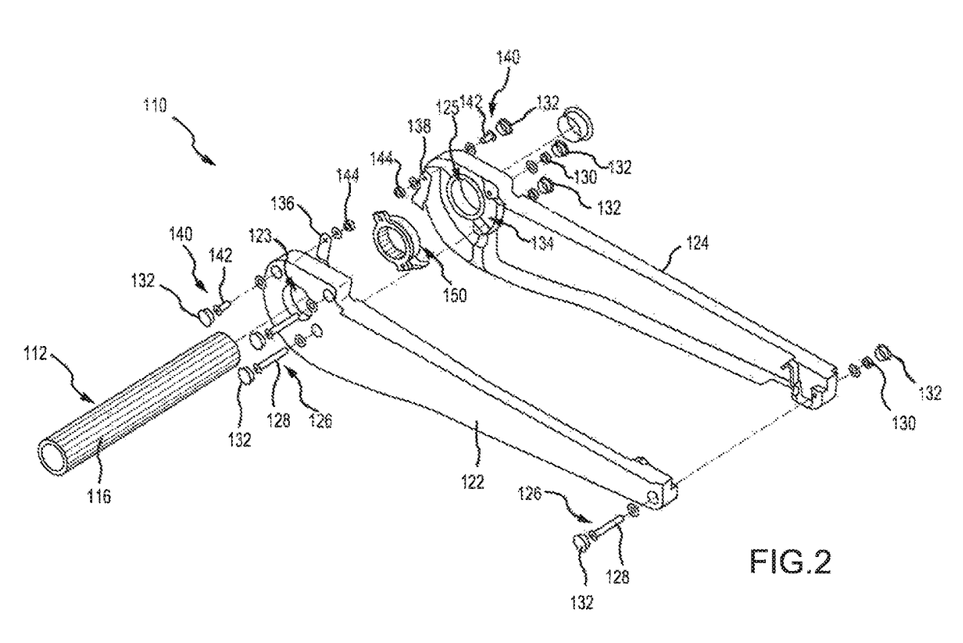
FIG. 2 illustrates an assembly view of an adjustable armrest having an angular armrest adjustment assembly, in accordance with various embodiments.

With reference to FIG. 2, an assembly view of an armrest 110 is illustrated. In accordance with various embodiments, armrest 110 includes a first casing 122 and a second casing 124. First and second casings 122, 124 may form the general structure, or frame, of armrest 110. In various embodiments, cushions, padding, fabric, paneling, and/or the like may be located over first and second casings 122, 124. First casing 122 defines a shaft opening 123. Second casing 124 defines a shaft opening 125. Shaft openings 123, 125 are configured to receive shaft 112. First and second casings 122, 124 may be mounted to frame 108, with momentary reference to FIG. 1, via shaft 112. In various embodiments, shaft 112 may be a splined shaft. In this regard, an outer circumferential surface of shaft 112 may define a plurality of radially outward (or first) teeth 116.

In accordance with various embodiments, first casing 122 may be coupled to second casing 124 via fasteners 126. In various embodiments, fasteners 126 may include bolts 128 and nuts 130. While fasteners 126 are illustrated as bolts and nuts, it is contemplated and understood that any suitable fastener (e.g., screws, rivets, clips, etc.) may be employed to secure first casing 122 to second casing 124. In various embodiments, fastener caps 132 may be located over bolts 128 and nuts 130. In various embodiments, a first spring detent 136 may be coupled to first casing 122 and a second spring detent 138 may be coupled to second casing 124. First and second spring detents 136, 138 may be coupled, respectively, to first and second casings 122, 124 via fasteners 140. Fasteners 140 may include bolts 142 and nuts 144. While fasteners 140 are illustrated as bolts and nuts, it is contemplated and understood that any suitable fastener (e.g., screws, rivets, clips, etc.) may be employed to secure first and second spring detents 136, 138. First and second spring detents 136, 138 are located between first casing 122 and second casing 124. Stated differently, first and second spring detents 136, 138 may be located in an internal armrest volume 134 defined by first and second casings 122, 124.

In accordance with various embodiments, armrest 110 includes an angular armrest adjustment assembly 150. Angular armrest adjustment assembly 150 is located between first casing 122 and second casing 124. Stated differently, angular armrest adjustment assembly 150 may be located in the internal armrest volume 134 defined by first and second casings 122, 124. Angular armrest adjustment assembly 150 is aligned with shaft openings 123, 125 in first and second casings 122, 124. Shaft 112 may be located through angular armrest adjustment assembly 150. As described in further detail below, angular armrest adjustment assembly 150 may be configured to rotate first and second casings 122, 124 about shaft 112.

Figure 3:
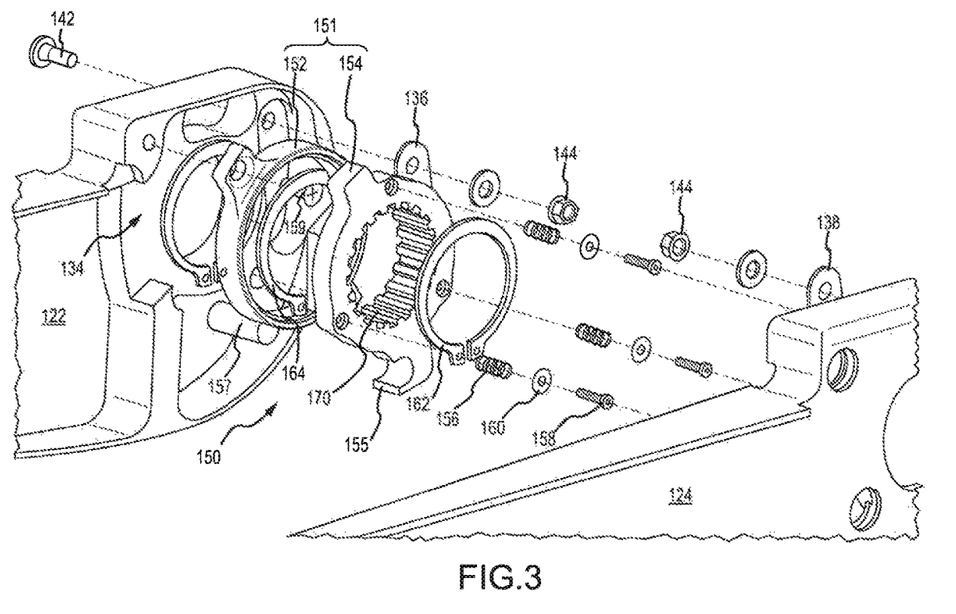
FIG. 3 illustrates an assembly view of an angular armrest adjustment assembly, in accordance with various embodiments.

With reference to FIG. 3, an assembly view of angular armrest adjustment assembly 150 is illustrated. In accordance with various embodiments, angular armrest adjustment assembly 150 may include an annular gear hub 151. Annular gear hub 151 includes a hub 152 and a lever ring 154. Hub 152 and lever ring 154 may each comprise a generally annular shape. In various embodiments, lever ring 154 may include a hook 155. Hook 155 may extend radially outward from lever ring 154. Hook 155 may be configured to contact a post, or protrusion, 157 extending from first casing 122, and thereby limit a rotation of first and second casings 122, 124 about shaft 112, with momentary reference to FIG. 2.

Angular armrest adjustment assembly 150 further includes one or more biasing member(s) 156. Biasing members 156 are located between lever ring 154 and second casing 124. Biasing members 156 are configured to apply a force against second casing 124. In this regard, biasing members 156 may bias (or force) second casing 124 away from lever ring 154. Biasing member 156 may comprise a coil spring, a Belleville washer, a compression spring, a leaf spring, or any other structure capable of applying a biasing force against second casing 124. In various embodiments, one or more spring support(s) 158 may be coupled to lever ring 154. Biasing members 156 may be located around spring supports 158. In various embodiments, a washer 160 may be located between each biasing member 156 and second casing 124. Each washer 160 may form an interface surface with its respective biasing member 156. In this regard, biasing members 156 may be compressed between, and/or may be in contact with, lever ring 154 and washer 160. In various embodiments, angular armrest adjustment assembly 150 may include three (3) biasing members 156 located approximately 120° apart. As used in the previous context only, "approximately" means±5°. In various embodiments, angular armrest adjustment assembly 150 may include more than three, or fewer than three, biasing members 156.

Angular armrest adjustment assembly 150 further includes a shaft clip 162 and a shaft clip 164. Shaft clips 162, 164 may be located on opposing sides of lever ring 154. In this regard, lever ring 154 is located between shaft clip 162 and shaft clip 164. Shaft clip 164 may be located between hub 152 and lever ring 154. In various embodiment, shaft clips 162, 164 may be circlips. Shaft clips 162, 164 are configured to engage shaft 112, with momentary reference to FIG. 2, and thereby prevent or reduce axial translation of lever ring 154 along shaft 112. As used herein, the term "axial" refers to directions parallel to an axis of rotation R (FIG. 1) of first and second casings 122, 124 of armrest 110, the term "circumferential" refers to directions about the axis of rotation R of first and second casings 122, 124 of armrest 110, and the term "radial" refers to directions perpendicular to the axis of rotation R of first and second casings 122, 124 of armrest 110.

In accordance with various embodiments, hub 152 may be coupled to first casing 122 via one or more fastener(s) 159. Fastener 159 may comprise a screw, bolt and nut, rivet, clip, or any other suitable fastener. Lever ring 154 may be coupled to shaft 112, with momentary reference to FIG. 2. In various embodiments, an inner circumferential surface of lever ring 154 may define a plurality of radially inward (or second) teeth 170. Radially inward teeth 170 are configured to engage (i.e., mesh with) radially outward teeth 116 of shaft 112, with momentary reference to FIG. 2. The intermeshing of radially inward teeth 170 and radially outward teeth 116 tends to block or prevent circumferential rotation of lever ring 154.

Figure 4A:
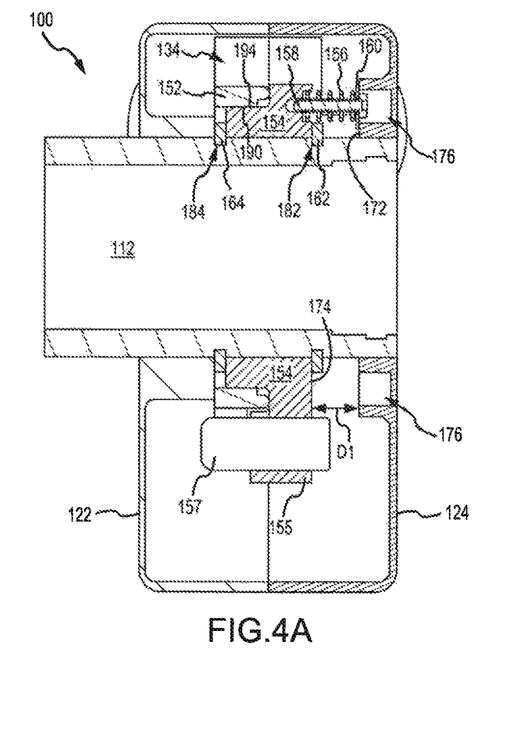
FIG. 4A illustrates a cross-section view of an adjustable armrest with the angular armrest adjustment assembly in an engaged or "locked" position, in accordance with various embodiments.

With reference to FIG. 4A, angular armrest adjustment assembly 150 is illustrated in an engaged or "locked" position. In the locked position, rotation of first and second casings 122, 124 of armrest 110 is generally prevented. In the locked position, washer 160 and an internal surface 172 of second casing 124 are located a distance D1 from an axial surface 174 of lever ring 154. Internal surface 172 of second casing 124 is oriented toward axial surface 174 of lever ring 154. Biasing member 156 may force washer 160 toward internal surface 172. In various embodiments, a groove, or channel, 176 may be formed in internal surface 172 of second casing 124. Channel 176 may be configured to receive an end (e.g., a head) of spring support 158.

Shaft clip 162 may be located in a first clip groove 182 defined by shaft 112. Shaft clip 164 may be located in a second clip groove 184 defined by shaft 112. Shaft clips 162, 164 are configured to block (i.e., form an interference with) lever ring 154, thereby preventing or reducing axial translation of lever ring 154. In this regard, lever ring 154 may be a generally fixed, or non-moving, structure, due to circumferential movement of lever ring 154 being prevented or reduced by the engagement between lever ring 154 and shaft 112, which is coupled to frame 108 (FIG. 1), and due to the axial movement of lever ring 154 being prevented or reduced by shaft clips 162, 164.

In accordance with various embodiments, in the locked position, hub 152 is configured to engage lever ring 154. For example, and with reference to FIGS. 5A and 5B, in various embodiments, hub 152 includes an inner splined surface 190 having a plurality of hub teeth 192. Inner splined surface 190 is configured to receive a portion 194 of lever ring 154. In this regard, portion 194 is configured to be located radially inward of inner splined surface 190. Portion 194 of lever ring 154 may extend away from internal surface 172 (FIG. 4A) of second casing 124.

Figure 5A:
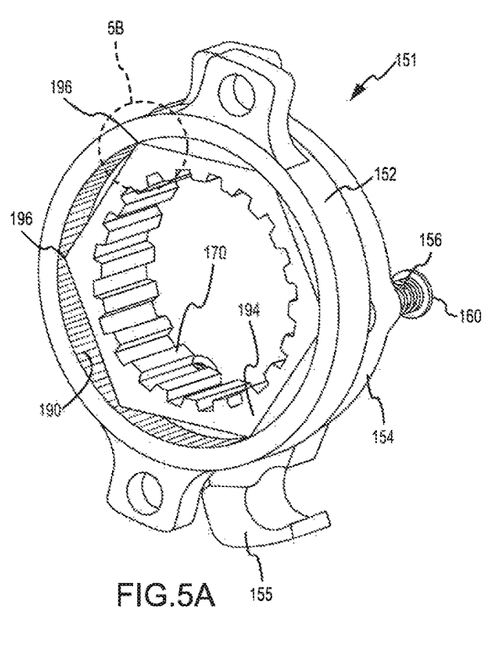
FIGS. 5A and 5B illustrate an annular gear hub for an angular armrest adjustment assembly, in accordance with various embodiments.
Figure 5B:
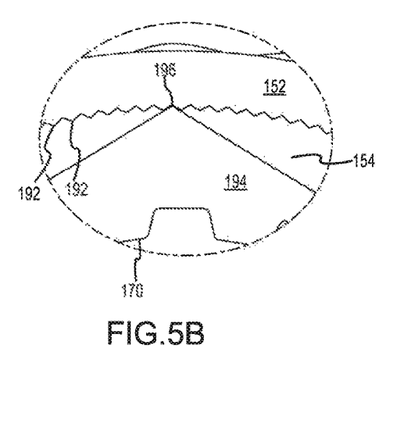

Portion 194 of lever ring 154 includes one or more interference points, or edges, 196 configured to engage inner splined surface 190. For example, interference points 196 are configured to be located between adjacent hub teeth 192. Locating an interference point 196 between adjacent hub teeth 192 prevents or reduces rotation of hub 152 relative to lever ring 154. While portion 194 is illustrated as having a hexagonal shape with six (6) interference points 196, it is contemplated and understood that portion 194 may have any shape (pentagonal, octagonal, decagonal, etc.) and may include any number of interference points. In various embodiments, portion 194 may be annular and may include a splined outer circumferential surface configured to engage inner splined surface 190 of hub 152.

In accordance with various embodiments, the number and/or pitch of hub teeth 192 may be selected based on the desired degree increments for armrest adjustment. In this regard, increasing the number of hub teeth 192, increases the number of possible armrest positions. Stated differently, decreasing the pitch between adjacent hub teeth 192 decreases the change in angle theta (θ), with momentary reference to FIG. 1, between each arm rest position. For example, the number of hub teeth 192 may be selected to allow for changes in armrest position in 2° increments, 3° increments, 5° increments, or any other desired increment.

Returning to FIG. 4A, in the locked position, the engagement between inner splined surface 190 of hub 152 and portion 194 of lever ring 154 prevents, or blocks, rotation of hub 152. Blocking rotation of hub 152 prevents, or reduces, rotation of first and second casings 122, 124 due to the coupling of first casing 122 to hub 152 and the coupling of second casing 124 to first casing 122.

Figure 4B:
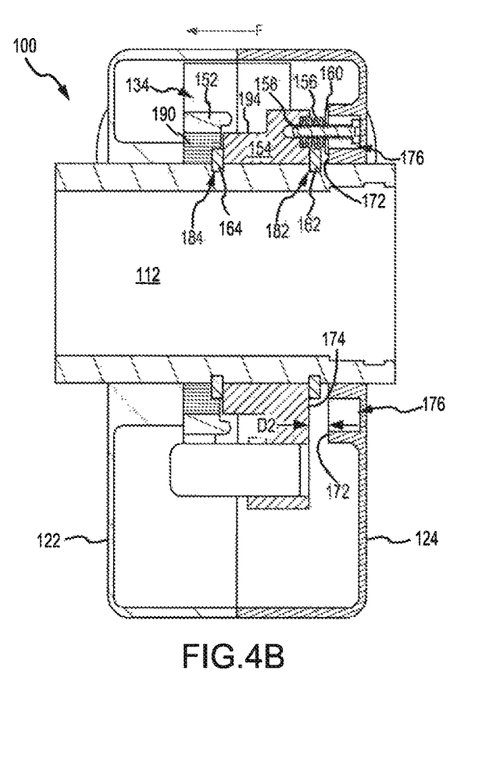
FIG. 4B illustrates a cross-section view of an adjustable armrest with the angular armrest adjustment assembly in a disengaged or "unlocked" position, in accordance with various embodiments.

With reference to FIG. 4B, angular armrest adjustment assembly 150 is illustrated in a disengaged or "unlocked" position. In the unlocked position, first and second casings 122, 124 of armrest 110 are able to rotate about shaft 112. In the unlocked position, second casing 124 is translated axially toward lever ring 154. For example, angular armrest adjustment assembly 150 may be translated to the unlocked position, in response to a force F being applied to armrest 110 by, for example, an occupant of the seat. Force F translates washer 160 and internal surface 172 of second casing 124 toward axial surface 174 of lever ring 154, thereby compressing biasing members 156 and decreasing the distance between axial surface 174 and washer 160 and/or between axial surface 174 and internal surface 172. In the locked position, washer 160 and internal surface 172 of second casing 124 are located a distance D2 from axial surface 174 of lever ring 154. Distance D2 is less than distance D1, with momentary reference to FIG. 4A. In accordance with various embodiments, as second casing 124 translates towards lever ring 154, spring support 158 may translate into channel 176.

Translation of second casing 124 toward lever ring 154 translates first casing 122, which is coupled to second casing 124, in an axial direction away from lever ring 154. Translation of second casing 124 toward lever ring 154 also translates hub 152, which is coupled to first casing 122, in the axial direction away from lever ring 154. In accordance with various embodiments, distance D1, in FIG. 4A, is selected to be greater than the length of engagement between inner splined surface 190 of hub 152 and portion 194 of lever ring 154. In this regard, translation of second casing 124, in response to force F, disengages hub 152 from lever ring 154. Once hub 152 is disengaged from the lever ring 154, hub 152 may be rotate circumferential about shaft 112, thereby rotating first and second casings 122, 124 and changing the angle theta θ of armrest 110 (with momentary reference to FIG. 1). Stated differently, in the disengaged position, hub 152 may rotate relative to lever ring 154. Once armrest 110 is at the desired angle, force F is removed or decreased (e.g., the seat occupant stops applying force F to the armrest), and biasing members 156 force second casing 124 away from lever ring 154. Stated differently, second casing 124 translates away from lever ring 154, in response to the force applied by biasing members 156 exceeding force F. Translation of second casing 124 away from lever ring 154 causes first casing 122 and hub 152 to translate axially toward portion 194 of lever ring 154. Hub 152 translates into engagement with lever ring 154, thereby preventing rotation of hub 152 and locking armrest 110 at the desired angle.

Armrest 110 including angular armrest adjustment assembly 150 may have fewer parts as compared to current adjustable armrest assemblies. Fewer parts tends to decrease a weight of the armrest, reduce costs, and/or simplify assembly. Angular armrest adjustment assembly 150 may allow for a greater number of possible armrest positions and/or a decreased number of degrees between armrest positions, thereby increasing occupant comfort.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An angular armrest adjustment assembly, comprising:
   a lever ring including an inner circumferential surface defining a plurality of radially inward teeth;
   a hub configured to receive a portion of the lever ring, the hub comprising an inner splined surface configured to engage an interference point formed by the portion of the lever ring;
   a biasing member configured to apply a force to the lever ring;
   a spring support coupled to the lever ring, wherein the biasing member comprises a coil spring located around the spring support;
   a first shaft clip located between the hub and the lever ring; and a second shaft clip located adjacent to an axial surface of the lever ring, wherein the lever ring is located axially between the first shaft clip and the second shaft clip.

2. The angular armrest adjustment assembly of claim 1, further comprising a washer located around the spring support, wherein the biasing member is located between the washer and the axial surface of the lever ring.

3. The angular armrest adjustment assembly of claim 1, wherein the lever ring includes a hook extending radially outward from the lever ring.

4. An armrest, comprising
a first casing;
a second casing coupled to the first casing; and
an angular armrest adjustment assembly located between the first casing and the second casing, the angular armrest adjustment assembly comprising:
a hub coupled to the first casing;
a lever ring configured to engage a splined surface of the hub;
a biasing member located between an internal surface of the second casing and an axial surface of the lever ring and configured to bias the second casing away from the lever ring; and
a shaft located through the first casing and the second casing, wherein an outer circumferential surface of the shaft defines a plurality of first teeth, and wherein the plurality of first teeth are intermeshed with a plurality of second teeth defined by an inner circumferential surface of the lever ring.

5. The armrest of claim 4, further comprising a spring support coupled to the lever ring, wherein an end of the spring support is located in a channel formed in the internal surface of the second casing.

6. The armrest of claim 4, wherein the angular armrest adjustment assembly further comprises:
a first shaft clip located in a first groove defined the shaft; and
a second shaft clip located in a second groove defined by the shaft, wherein the lever ring is located axially between the first shaft clip and the second shaft clip.

7. The armrest of claim 6, wherein a portion of the lever ring includes a plurality of interference points configured to engage the splined surface of the hub.

8. The armrest of claim 7, wherein a distance between the internal surface of the second casing and the axial surface of the lever ring is greater than a length of engagement between the splined surface of the hub and the lever ring.

9. The armrest claim 8, wherein axial translation of the second casing toward the axial surface of the lever ring is configured to disengage the hub from the lever ring.

10. A seat, comprising:
a frame;
a seatback and a seat pan coupled to the frame;
an armrest coupled to the frame, the armrest including a first casing and a second casing coupled to the first casing; and
an angular armrest adjustment assembly located within an internal volume of the armrest and configured to rotate the armrest relative to the frame, the angular armrest adjustment assembly comprising:
a hub coupled the first casing of the armrest;
a lever ring configured to engage a splined surface of the hub;
a biasing member located between an internal surface of the second casing and an axial surface of the lever ring and configured to bias the second casing of the armrest away from the lever ring; and
a shaft coupled to the frame, wherein the shaft is located through the first casing and the second casing, and wherein an outer circumferential surface of the shaft defines a plurality of first teeth, and wherein the plurality of first teeth are intermeshed with a plurality of second teeth defined by an inner circumferential surface of the lever ring,
wherein axial translation of the second casing toward the axial surface of the lever ring is configured to disengage the hub from the lever ring,
wherein a distance between the internal surface of the second casing and the axial surface of the lever ring is greater than a length of engagement between the splined surface of the hub and the lever ring.

11. The seat of claim 10, further comprising a spring support coupled to the lever ring, wherein an end of the spring support is located in a channel formed in the internal surface of the second casing.

12. The seat of claim 10, wherein the angular armrest adjustment assembly further comprises:
a first shaft clip located in a first groove defined by the shaft; and
a second shaft clip located in a second groove defined by the shaft, wherein the lever ring is located axially between the first shaft clip and the second shaft clip.

* * * * *